United States Patent [19]

Nagao

[11] Patent Number: 5,659,809
[45] Date of Patent: Aug. 19, 1997

[54] CAMERA CAPABLE OF ZOOMING

[75] Inventor: Masaki Nagao, Tokyo, Japan

[73] Assignee: Olympus Optical Co., Ltd., Tokyo, Japan

[21] Appl. No.: 553,195

[22] Filed: Nov. 7, 1995

Related U.S. Application Data

[63] Continuation of Ser. No. 210,601, Mar. 15, 1994, abandoned.

[30] Foreign Application Priority Data

Mar. 16, 1993 [JP] Japan ................................ 5-056001

[51] Int. Cl.⁶ .......................... G03B 1/18; G03B 17/02
[52] U.S. Cl. .................................... 396/60; 396/435
[58] Field of Search ...................... 354/195.1, 195.11, 354/195.12, 159, 94, 21; 396/60, 435, 436, 77, 72, 76, 238, 239

[56] References Cited

U.S. PATENT DOCUMENTS

| | | | |
|---|---|---|---|
| Re. 32,797 | 12/1988 | Harvey | 354/481 |
| 5,057,857 | 10/1991 | Hata et al. | 354/106 |
| 5,323,204 | 6/1994 | Wheeler et al. | 354/412 |
| 5,325,140 | 6/1994 | Torikoshi et al. | 354/159 |

FOREIGN PATENT DOCUMENTS

| | | |
|---|---|---|
| 61-223831 | 10/1986 | Japan . |
| 61-285432 | 12/1986 | Japan . |
| 61-295534 | 12/1986 | Japan . |
| 62-50745 | 3/1987 | Japan . |
| 64-55544 | 3/1989 | Japan . |
| 2-306229 | 12/1990 | Japan . |

*Primary Examiner*—Safet Metjahic
*Assistant Examiner*—Nicholas J. Tuccillo
*Attorney, Agent, or Firm*—Frishauf, Holtz, Goodman, Langer & Chick

[57] ABSTRACT

In a camera capable of zooming, a range narrower than an ordinary photographing imaging field range can be specified as a printing range by a pseudo telephoto mode. A horizontally long area can be specified as a printing range by blocking photographing light beams at upper and lower portions of the ordinary imaging field range in a panorama mode. This mode state is discriminated by a mode state discriminating mechanism. When a latest mode discriminated by the mode state discriminating mechanism is the pseudo telephoto mode, a canceling mechanism cancels the panorama mode even if a mode preceding to the latest mode is the panorama mode.

28 Claims, 12 Drawing Sheets

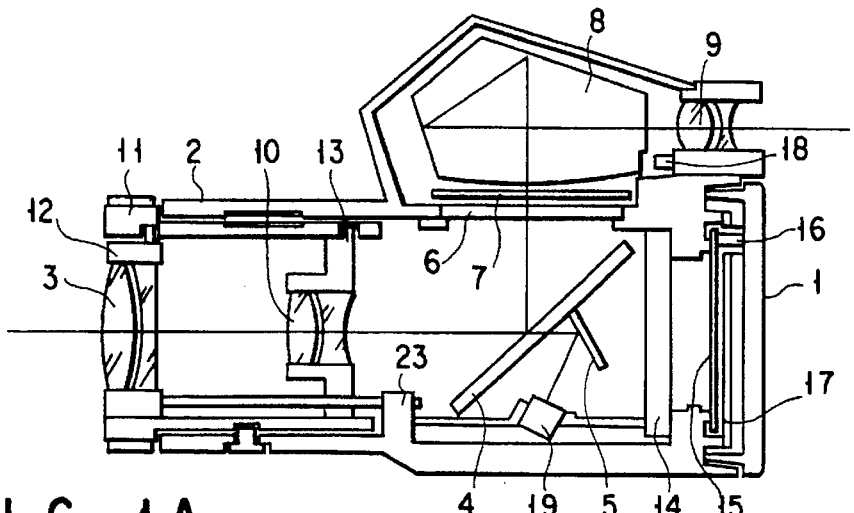
F I G. 1A
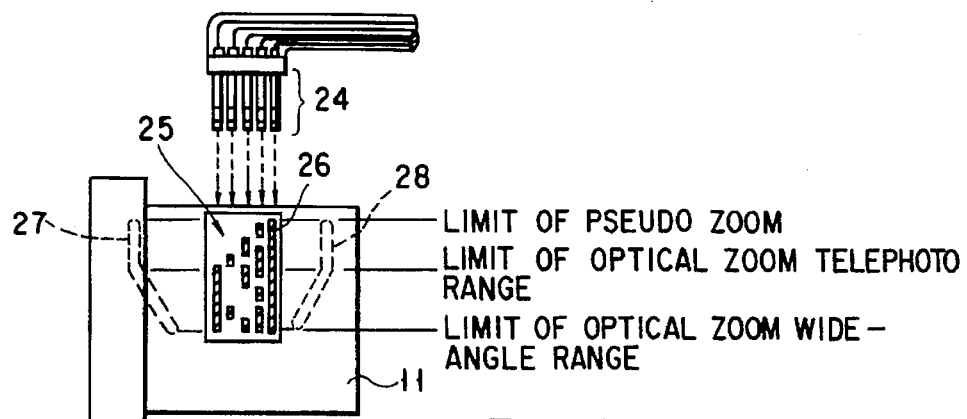
F I G. 1B
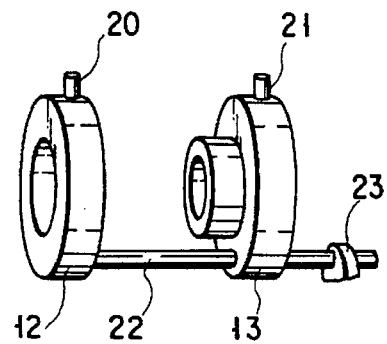
F I G. 1C

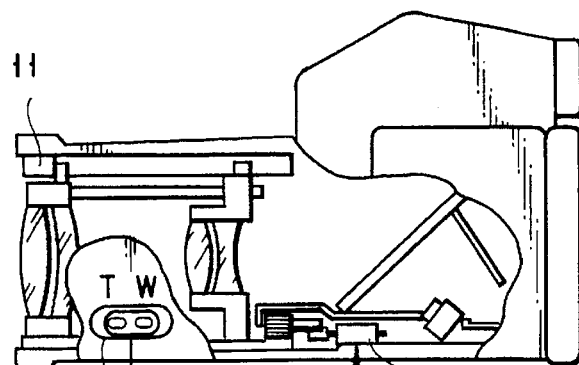
FIG. 4A
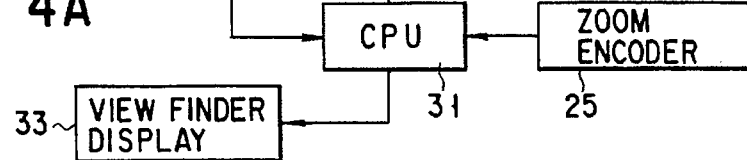
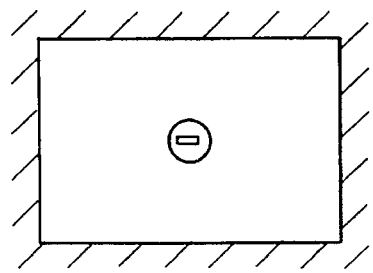
FIG. 4B
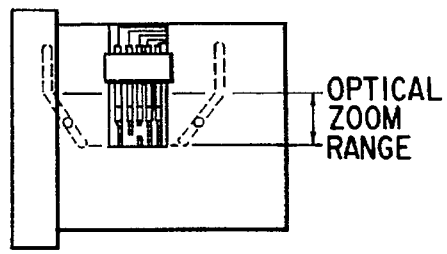
FIG. 4C
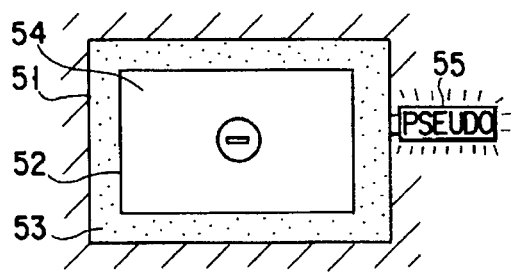
FIG. 4D
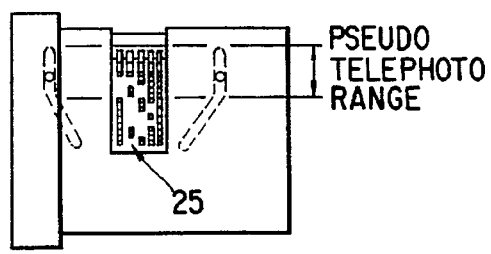
FIG. 4E
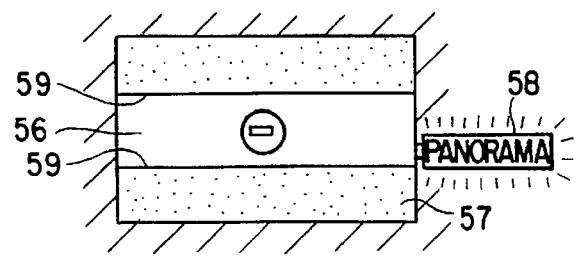
FIG. 4F

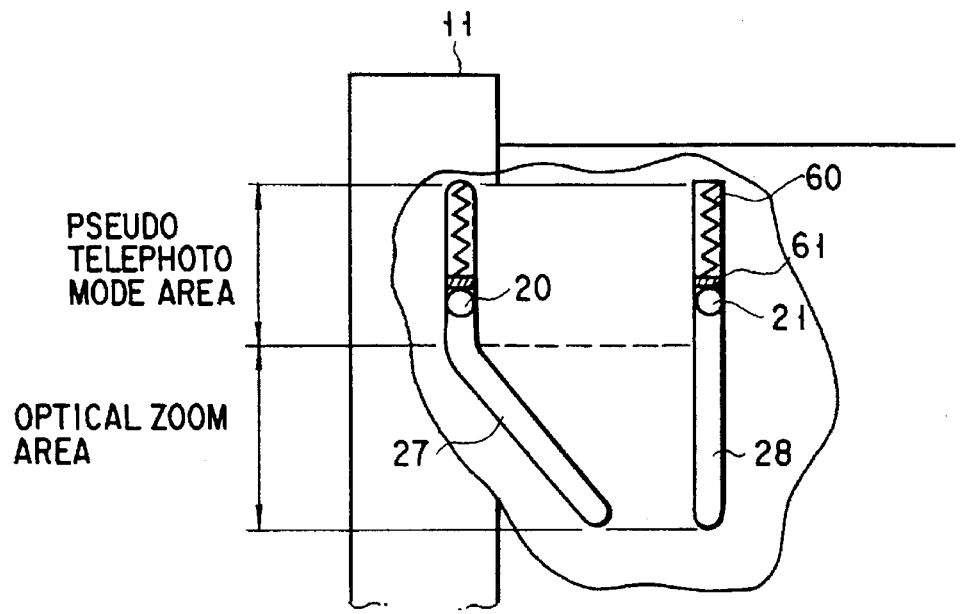
F I G. 10
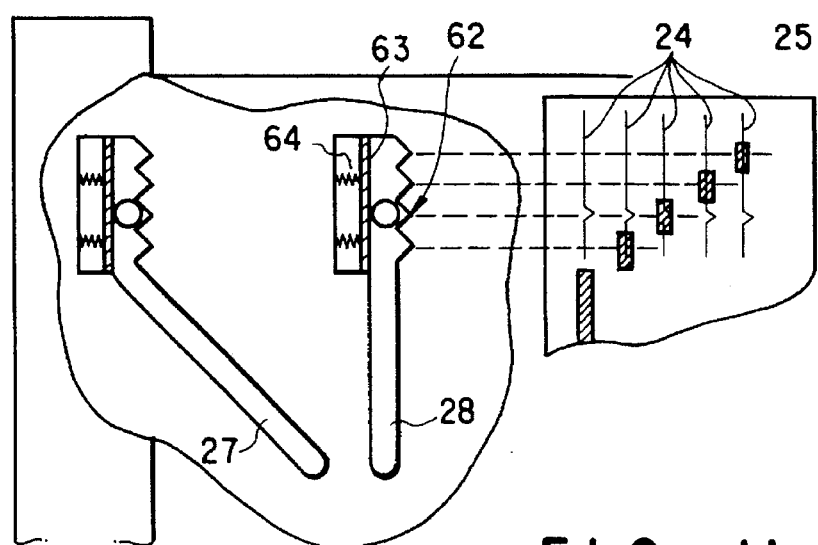
F I G. 11

| PRESENT ZOOM MODE \ INPUT FOCAL LENGTH | SCOPE THAT CAN BE COVERED BY OPTICAL ZOOM | | SCOPE EXCEEDING SCOPE THAT CAN BE COVERED BY OPTICAL ZOOM |
|---|---|---|---|
| | $fo \geq f$ | $fo < f$ | |
| OPTICAL ZOOM MODE | TO OPTICALLY ZOOM BY PHOTOGRAPHING LENS ZOOMING DRIVE UNIT | | TO OPTICAL ZOOM UNTIL TELEPHOTO END AND PERFORM PSEUDO TELEPHOTO ZOOMING AFTER THAT |
| PSEUDO TELEPHOTO MODE | TO PERFORM PSEUDO TELEPHOTO ZOOMING WHILE PHOTOGRAPHING LENS IS KEPT STOPPED | | |

FIG. 13

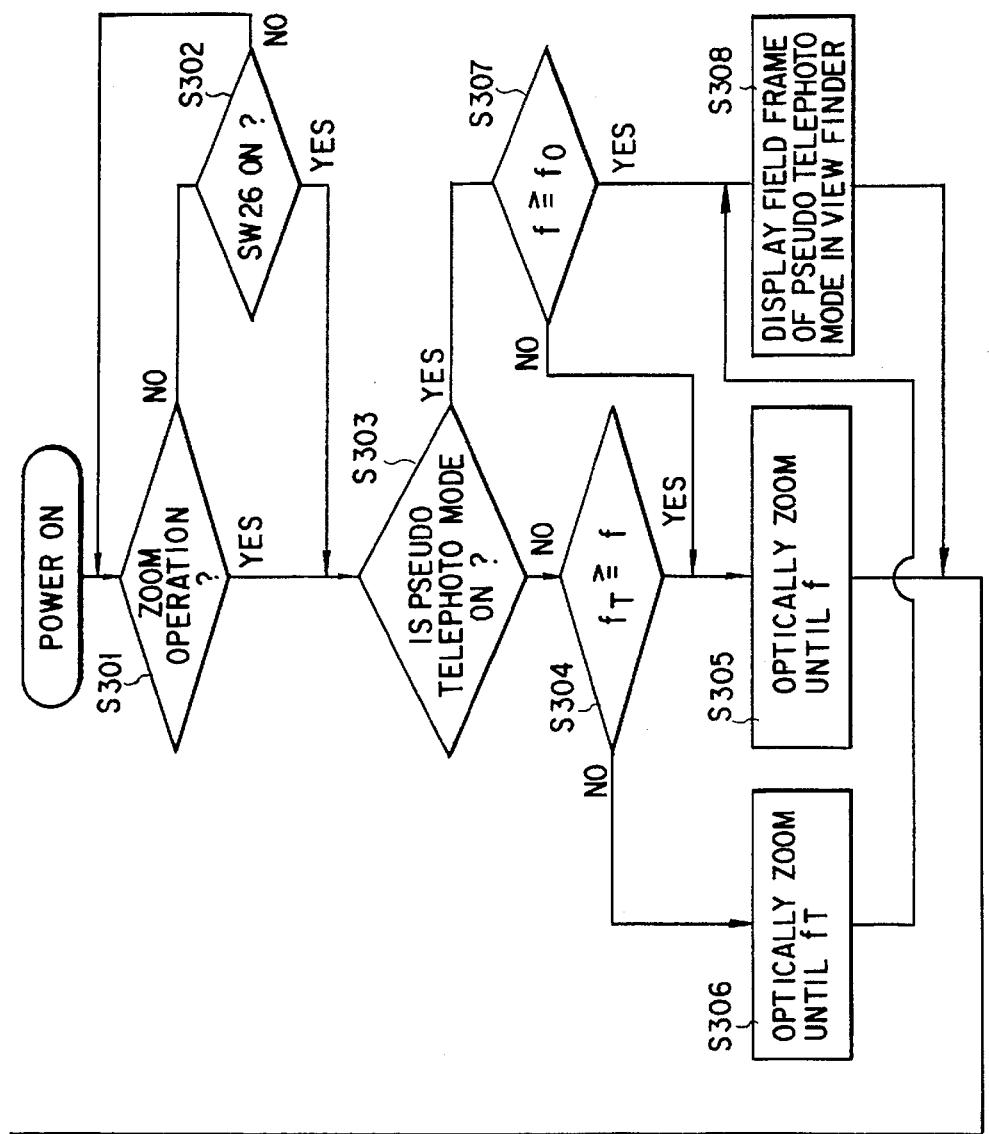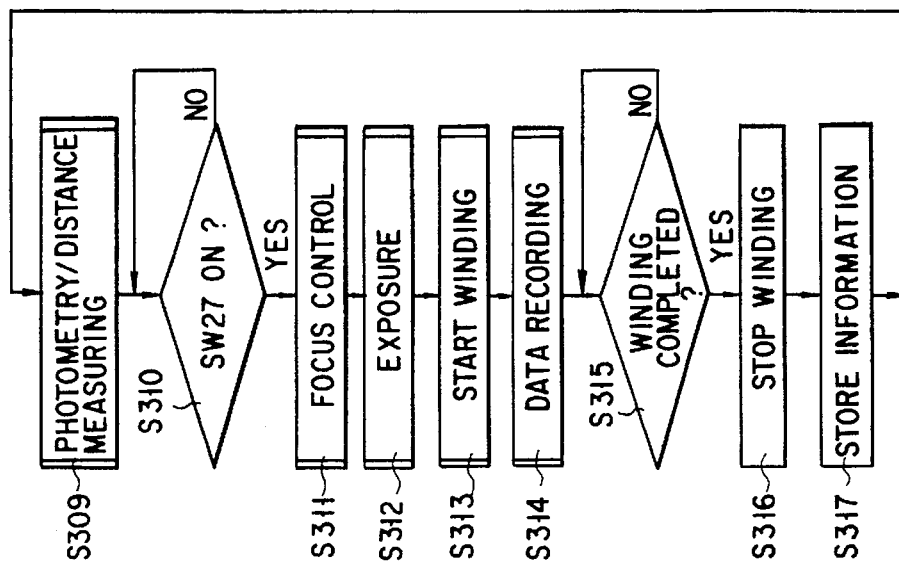
FIG. 14

CAMERA CAPABLE OF ZOOMING

This application is a Continuation of application Ser. No. 08/210,601, filed Mar. 15, 1994, now abandoned.

BACKGROUND OF THE INVENTION

1. Field of the Invention

The present invention relates to a camera and, more particularly, to a camera capable of freely selecting a pseudo telephoto mode and a panorama mode in addition to an ordinary photographing mode.

2. Description of the Related Art

So-called panorama size printing in which the aspect ratio of printing is changed to obtain an imaging field horizontally longer than an ordinary imaging field has conventionally been spreading because it has a specific interesting imaging field effect.

Furthermore, a technique is also developed to perform trimming photographing by specifying a trimming range which is narrower than that of an ordinary photographing mode with which an ordinary photographing range is photographed.

For example, Jpn. Pat. Appln. KOKAI Publication Nos. 61-223831, 61-285432, and 61-295534 disclose the following techniques. Namely, after the zoom ring is rotated so that the zoom lens reaches the wide-angle end, when the zoom ring is further rotated, it is set at a panorama switching position, thereby enabling panorama photographing. These techniques provide a pseudo telephoto mode and a trimming mode. These techniques also include a technique for easily obtaining a picture having a telephoto effect without requiring a complicated photographing optical system.

Also, Jpn. Pat. Appln. KOKAI Publication No. 2-306229 discloses a technique with which a powered electric zoom lens is automatically moved to the wide-angle end when the panorama mode is selected.

Regarding the technique concerning limitation of the trimming mode, a technique disclosed in Jpn. Pat. Appln. KOKAI Publication No. 62-50745 for limiting the trimming magnification by means of the film speed, a technique disclosed in Jpn. Pat. Appln. KOKAI Publication No. 64-55544 for prohibiting trimming when a signal indicating that the object is outside the interlocked range is generated by an automatic focusing apparatus, and the like are available.

With the above techniques, however, if the powered zoom lens is merely moved to the wide-angle end, although a panorama picture can be obtained, a specific interesting imaging field effect different from what is obtained by a picture having an ordinary aspect ratio cannot be obtained with the ordinary zoom range. Then, an image enlarging ratio in printing is increased in the pseudo telephoto mode, so that the printing image quality can be easily degraded.

Also, in panorama size printing, the image enlarging ratio in printing is large, so that a problem similar to that occurring in the pseudo telephoto mode may undesirably arise.

In addition, if it is difficult to identify whether the current mode is the optical zoom mode or the pseudo telephoto mode the camera, permission/non-permission of the panorama mode may be erroneously recognized, or the printing quality may be unexpectedly degraded, leading to complaints of the user.

SUMMARY OF THE INVENTION

The present invention has been made in view of the above problems, and has as its object to enable selection of the panorama mode whenever the camera is set in the optical zoom mode, and in the pseudo telephoto mode, although printing having a pseudo telephoto effect is enabled, to disable setting the camera in the panorama mode, thereby obtaining a high-quality image and allowing easy discrimination as to which one of a plurality of modes is selected.

With a camera according to the first aspect of the present invention, the magnification of the object is changed by optically shifting the photographing lens in the optical zoom mode, a photographing imaging field range narrower than an ordinary photographing imaging field range can be specified as a printing range in the pseudo telephoto mode, and a horizontally long area obtained by removing the upper and lower portions of an ordinary photographing imaging field range can be specified as a printing range in the panorama mode. A mode state discriminating means discriminates whether the camera is set in the pseudo telephoto mode or the optical zoom mode among the above modes. If the mode state discriminating means discriminates that the camera is in the pseudo telephoto mode, a canceling means cancels the panorama mode state regardless of the state of the panorama mode.

With a camera according to the second aspect of the present invention, the magnification of the object is changed by optically shifting the photographing lens in the optical zoom mode, a photographing imaging field range narrower than an ordinary photographing imaging field range can be specified as a printing range in the pseudo telephoto mode, and a horizontally long area obtained by removing the upper and lower portions of an ordinary photographing imaging field range can be specified as a printing range in the panorama mode.

The panorama mode state discriminating means determines whether or not the camera is set in the panorama mode state. When a discrimination output from the panorama mode state discriminating means indicates the panorama mode and thereafter the pseudo telephoto mode is selected, the prohibiting means prohibits to set the camera in the pseudo telephoto mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a view showing the arrangement of a camera according to the first embodiment of the present invention, FIG. 1B is a view showing a pattern 26 on an encoder 25, and FIG. 1C is a view showing the arrangement of an optical system in detail;

FIG. 4A is a view showing the arrangement of a CPU 31 with its vicinity of the first embodiment, FIG. 4B shows an ordinary view finder display example, FIG. 4C shows an optical zoom range, FIG. 4D shows a view finder display example of the pseudo telephoto mode, FIG. 4E shows a pseudo telephoto range, and FIG. 4F shows a view finder display example of the panorama photographing mode;

FIG. 10 is a view for explaining a technique with which the photographer can easily sense that the camera is set in the pseudo telephoto mode;

FIG. 11 is a view for explaining the technique with which the photographer can easily sense that the camera is set in the pseudo telephoto mode;

FIG. 13 is a table for explaining in detail operations corresponding to mode selection of the camera according to the second embodiment; and FIG. 14 is a flow chart showing the control sequence of the second embodiment.

DETAILED DESCRIPTION OF THE PREFERRED EMBODIMENTS

Figure 2:
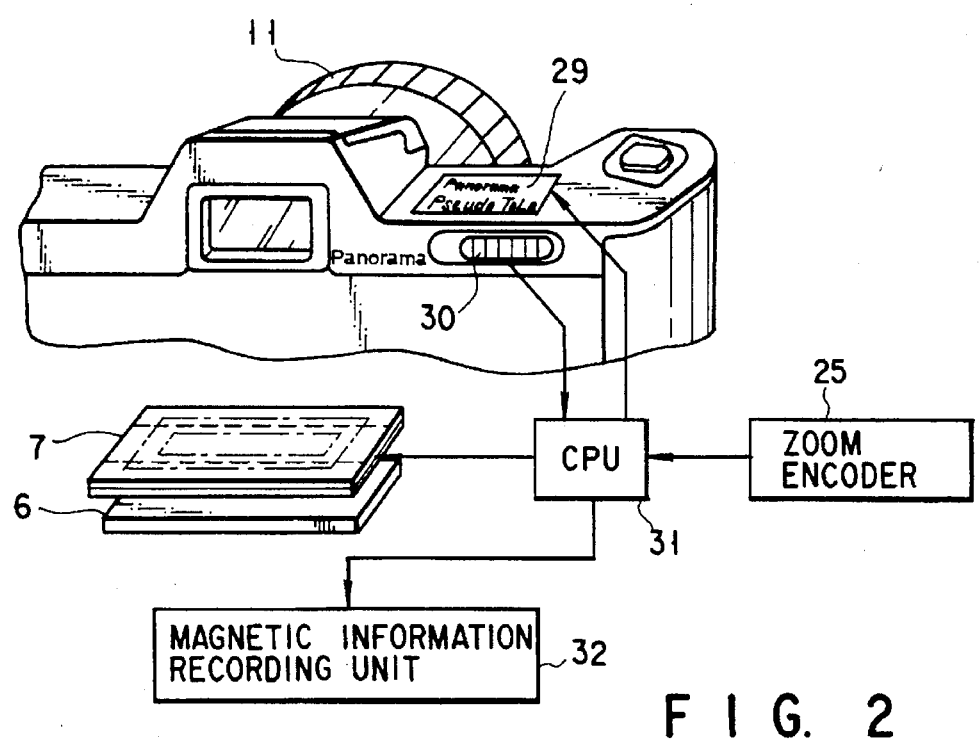
FIG. 2 is a view schematically showing the control system of the embodiment of FIGS. 1A, 1B, and 1C.

The preferred embodiments of the present invention will be described with reference to the accompanying drawings.

FIGS. 1A, 1B, and 1C show the arrangement of a camera capable of zooming according to the first embodiment of the present invention.

As shown in FIG. 1A, the camera body is mainly constituted by a mirror box section, a view finder section, and a rear cover section.

The mirror box section is constituted by a lens-barrel 2 for holding the photographing lens, a main mirror 4, and a sub mirror 5. The main mirror 4 splits the beam incident on the photographing lens into a beam directed to a view finder optical system and a beam directed to an automatic focus detection unit 19. Furthermore, in photographing, since the main mirror 4 retreats, a shutter 14 is released so that the beam reaches a film 15.

The view finder section is constituted by a view finder field frame 7, a pentaprism 8, a view finder magnifier 9, and a photometric element 18. The view finder field frame 7 forms, together with a reticle 6, a range indicating the view field of the photographer in the view finder in accordance with switching and selection of the imaging field size.

The rear cover section is constituted by a film holding plate 17, an image recording unit 16, and a rear cover 1. The image recording unit 16 records various types of information on a film.

A lens group 3 is held by a frame 12, and a lens group 10 is held by a frame 13. Furthermore, as shown in FIGS. 1B and 1C, projections 20 and 21 respectively formed on the frames 12 and 13 are guided by cam grooves 27 and 28 formed in the zoom frame 11, so that the frames 12 and 13 surrounding the lens groups 3 and 10 are moved in the direction of the optical axis as the zoom frame 11 is rotated.

As shown in FIG. 1C, a shaft 22 integrally formed with the frame 12 is fitted in a guide hole formed in a projection 23 of the camera body and simultaneously in a guide hole formed in the frame 13, thereby regulating rotation of the frame 13 around the optical axis.

As shown in FIG. 1B, a zoom encoder 25 for detecting the position of the zoom frame 11 in the rotating direction is provided on the circumferential surface of the zoom frame 11. Electrical contacts 24 arranged at fixed positions are compression-bonded on a pattern 26 on the zoom encoder 25. When the photographer rotates the zoom frame 11 to enlarge or reduce the object image, the rotational angle is converted to an electrical signal by the zoom encoder 25 and detected.

Each of the cam grooves 27 and 28 formed in the zoom frame 11 has first and second areas. In the first area, the positions of the cam grooves 27 and 28 are changed in the direction of the optical axis as the zoom frame 11 rotates. In the second area, the cam grooves 27 and 28 are formed in a direction perpendicular to the optical axis.

When the projections 20 and 21 on the frames 12 and 13 are fitted in the cam grooves 27 and 28 in the first area, the frames 12 and 13 shift in the direction of the optical axis as the zoom frame 11 rotates. In contrast to this, when the projections 20 and 21 are fitted in the cam grooves 27 and 28 in the second area, the frames 12 and 13 will not shift in the direction of the optical axis.

The lens groups 3 and 10 are optical systems for changing a distance between each other, a distance from the film surface, and the like, thereby providing a variable magnification effect. When the projections 20 and 21 are located in the cam grooves 27 and 28 in the first area, the magnification of the image is optically changed as the zoom frame 11 rotates. Note that when the projections 20 and 21 are located in this area, the camera is in the optical zoom mode.

When the projections 20 and 21 are located in the cam grooves 27 and 28 in the second area, the magnification of the image on the film is not optically changed by rotation of the zoom frame 11.

In contrast to this, rotation of the zoom frame 11, i.e., the magnification change amount intended by the photographer is electrically detected by the zoom encoder 25. A signal from the zoom encoder 25 is transmitted to a CPU 31.

At this time, as shown in FIG. 2, the CPU 31 sends a field frame setting signal corresponding to rotation of the zoom frame 11 to the view finder field frame 7 using a known LCD (Light Crystal Display).

Figure 3:
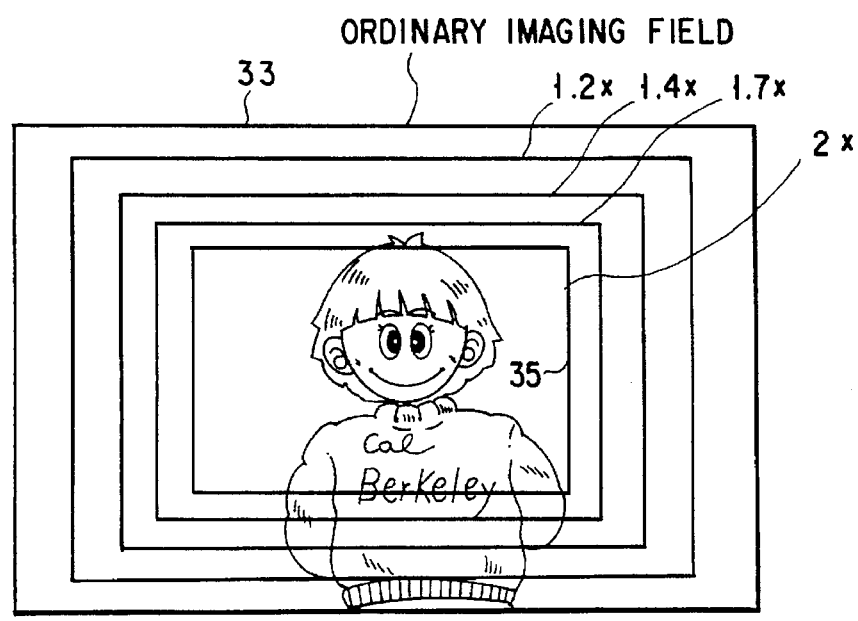
FIG. 3 is a view showing a state wherein a view finder field frame having a narrower range than that of an ordinary imaging field is displayed in the view finder imaging field.

Then, as shown in FIG. 3, a view finder field frame having a narrower range than that of an ordinary imaging field is displayed in the finder imaging field, so that the area that can be utilized for printing can be observed. For example, when the magnification is 2×, a field frame 35 of about ¼ that of an ordinary imaging field 33 is displayed at the center of the view finder imaging field. This means that this range is utilized for printing by enlargement. The CPU 31 transmits information concerning the printing imaging field range to a magnetic information recording unit 32 in order to record on the magnetic recording section on the film the imaging field range to be utilized for printing. This technique will be described later. As shown in FIG. 3, this information may be the magnification or a discrimination signal of the imaging field range.

A laboratory for development and enlargement performs printing based on the information on the film. If photographing is performed after the zoom frame is rotated until a state corresponding to the 2× field frame in FIG. 3 is obtained, only the central portion of the imaging field corresponding to the view finder field frame 35 is enlarged and printed, so that a picture similar to that obtained by 2× zooming can be obtained. This state is called the pseudo telephoto mode of the camera.

In contrast to this, when a panorama mode selection switch 30 (i.e., panorama mode specifying means or first trimming mode specifying means) in FIG. 2 is switched to the panorama side, a panorama mode for obtaining a printed picture horizontally longer than an ordinary imaging field can be selected.

Practical examples of view finder display of the first embodiment will be described in more detail with reference to FIGS. 4A to 4F.

Referring to FIG. 4A, a zoom frame 11 is driven by an actuator 60, and the zooming operation is performed by depressing a zoom switch 34 (i.e., pseudo telephoto specifying means or second trimming mode specifying means).

A zoom encoder 25 is provided on the zoom frame 11, in the same manner as in the arrangement of the first embodiment shown in FIGS. 1A, 1B, and 1C, and the zoom state information from the zoom encoder 25 is transmitted to a CPU 31. Based on this information, the CPU 31 transmits the display content to a view finder display 33, e.g., to an LCD display panel 7 of FIG. 2 (see FIG. 4B).

When the camera is set in the pseudo telephoto mode, a field frame 52 is displayed, as shown in FIG. 4D, and an area 53 outside the field frame 52 is set to have a decreased light transmittance, thereby clearly indicating the printing range with respect to an area 54 inside the field frame 52. At this time, in order to prevent erroneous recognition of the mode, a display 55 is displayed outside the view finder field by means of characters "PSEUDO" or symbols indicating that the present mode is a "pseudo" mode.

When the panorama mode is selected by the panorama mode selection switch 30 of FIG. 2, a horizontally long picture frame 59 is displayed on the view finder in the same manner as in the pseudo telephoto mode, as shown in FIG. 4F, and areas 57 outside the picture frame 59 are set to have a decreased light transmittance, thereby clearly indicating the printing range with respect to an area 56 inside the picture frame 59. At this time, a display 58, e.g., "PANORAMA" indicating that the present mode is a "panorama mode" is displayed outside the view finder field to clearly indicate the present mode. The optical zoom range and the pseudo telephoto range are as shown in FIGS. 4C and 4E.

Figure 5:
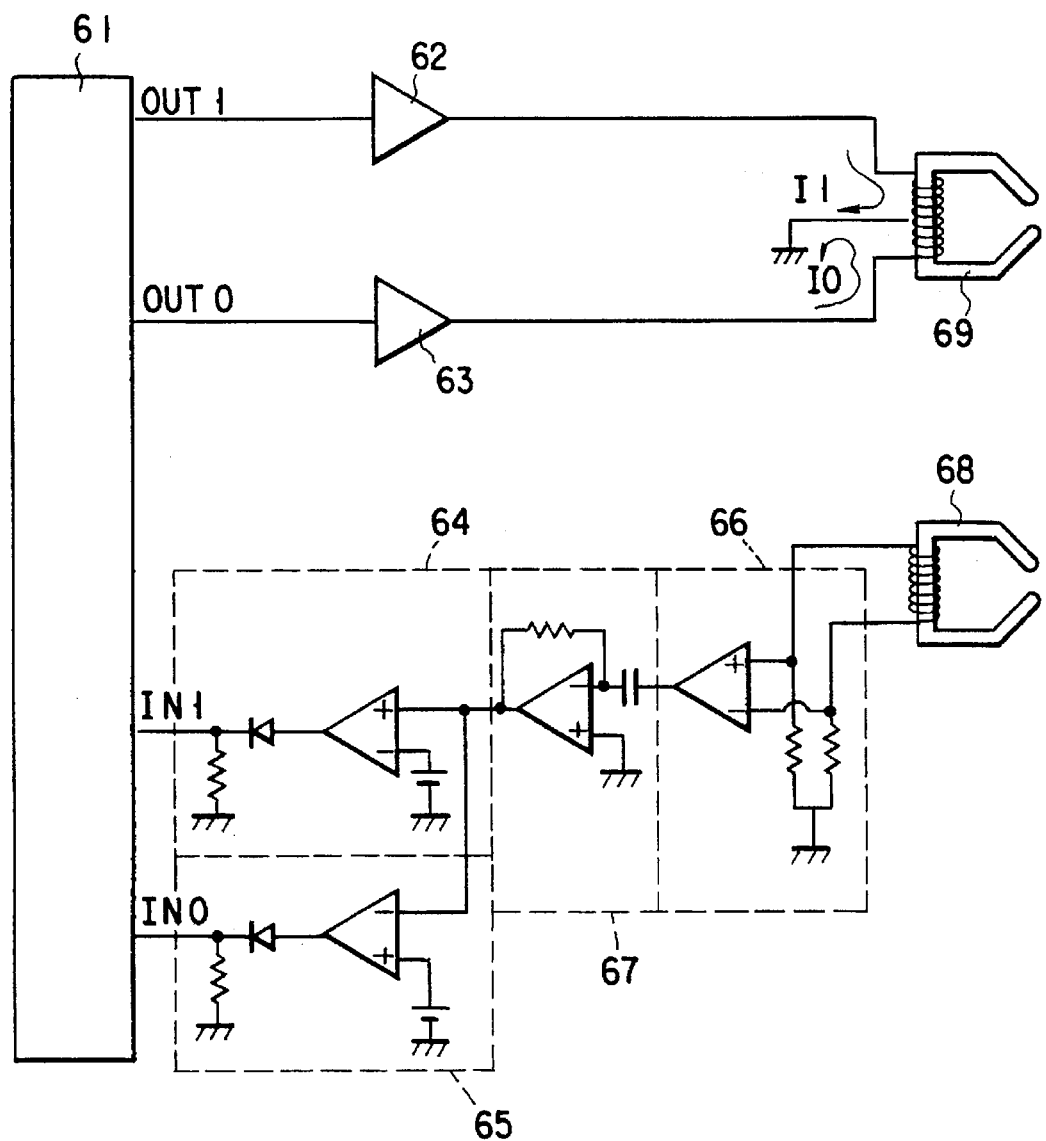
FIG. 5 is a block diagram showing in detail the arrangement of a circuit for performing magnetic recording/reproduction in the first embodiment.

The magnetic recording/reproducing scheme of the first embodiment will be described in detail with reference to FIGS. 5 and 6.

In the first embodiment, a magnetic recording medium can have three magnetization states, i.e., an N-direction magnetization state, an S-direction magnetization state, and a neutral state.

Assume that "1" is to be recorded where "1" is the N-direction magnetization state and "0" is the S-direction magnetization state. When a high-level "H" signal is output to a port OUT1 of a CPU 61, as indicated by a waveform a of FIG. 6, a current I1 flows through the coil of a recording head 69 through a buffer 62, as indicated by a waveform c of FIG. 6. At this time, the magnetic recording medium is magnetized in the N direction, as indicated by a waveform d of FIG. 6.

Inversely, assume that "0" is to be recorded. When a high-level "H" signal is output to a port OUT0 of the CPU 61, as indicated by a waveform b of FIG. 6, a current I0 flows through the coil of the recording head 69 through a buffer 63, as indicated by the waveform S of FIG. 6. At this time, the magnetic recording medium is magnetized in the S direction, as indicated by the waveform d of FIG. 6. In this manner, this magnetic recording/reproducing scheme has an advantage in that since neutral areas can be provided among the bits, the boundaries of the bit data become clear, so that a sync clock becomes unnecessary.

Assume that "reproduction" is to be performed. When a magnetized portion passes by a head 68, the magnetic field across the head 68 is changed, and thus a voltage is generated. The voltage is amplified by a head amplifier 66, as indicated by a waveform e of FIG. 6, and an output from the head amplifier 66 is differentiated by a differentiating circuit 67, as indicated by a waveform f of FIG. 6, and is input to comparators 64 and 65.

Figure 6:
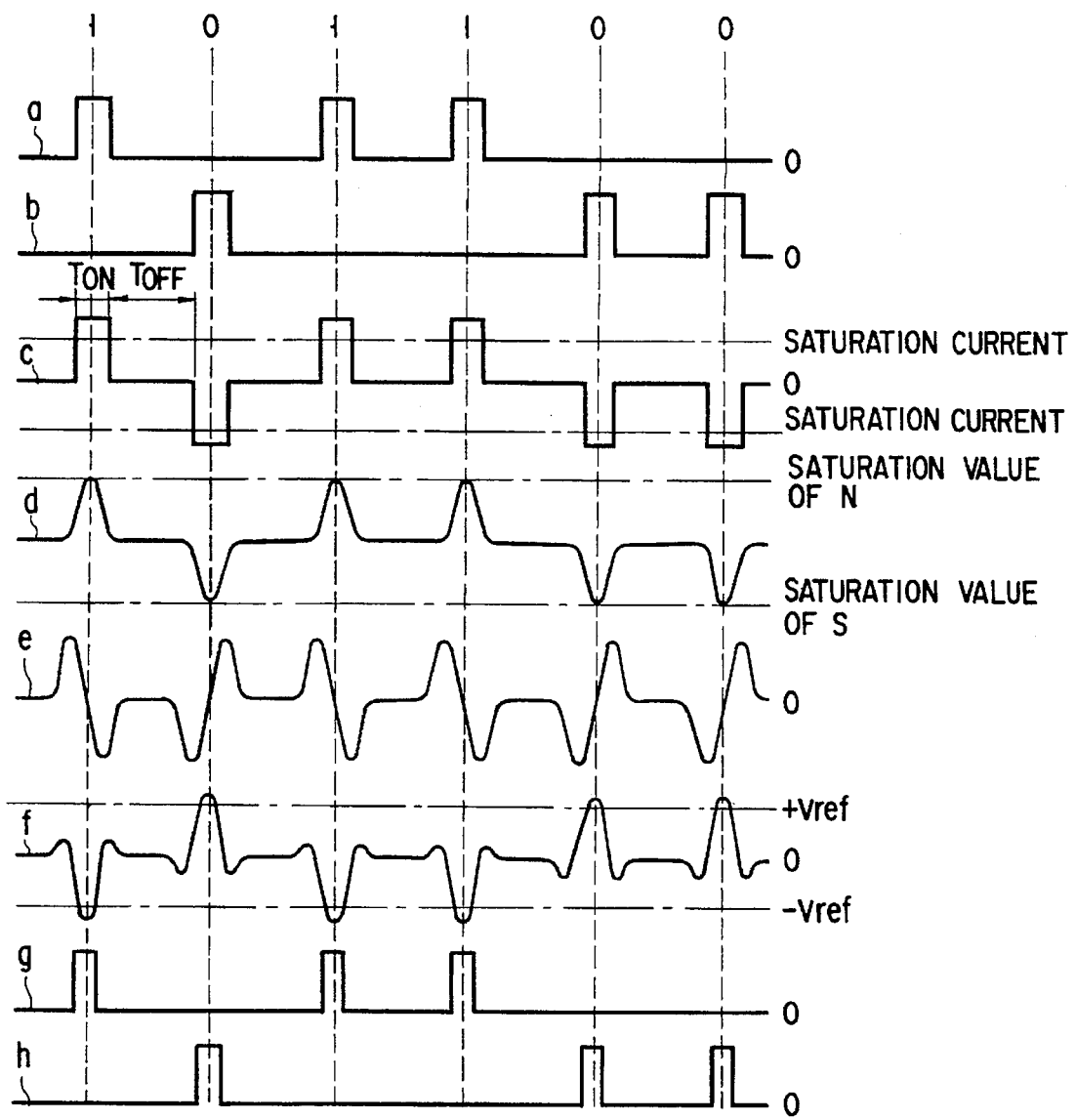
FIG. 6 is a timing chart for explaining the magnetic recording/reproducing scheme of the first embodiment.

When the recorded data is "1", the differentiated output forms a negative peak, as indicated by the waveform f of FIG. 6. Thus, the output from the comparator 64 is inverted, and a high-level signal "H" is input to a port IN1 of the CPU 61, as indicated by a waveform g of FIG. 6.

Inversely, when the recorded data is "0", the differentiated output forms a positive peak, as indicated by the waveform f of FIG. 6. Thus, the output from the comparator 65 is inverted, and a high-level signal "H" is input to a port IN0 of the CPU 61, as indicated by a waveform h of FIG. 6.

Accordingly, various types of information including information concerning selection of the pseudo telephoto mode and the panorama mode can be recorded on the film based on the instruction of the CPU 61.

The control method of the first embodiment will be described with reference to FIGS. 7 and 8.

Figure 7:
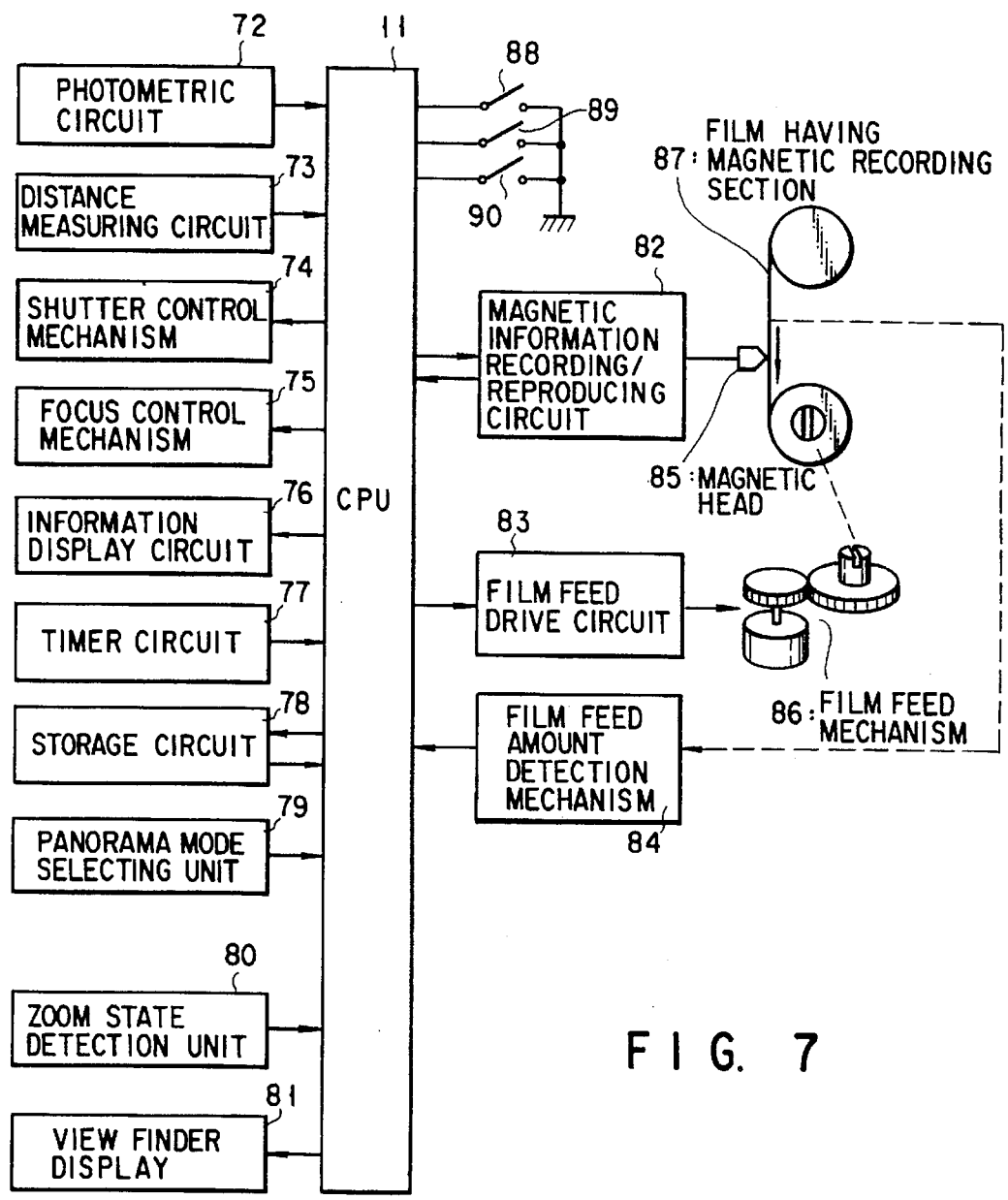
FIG. 7 is a diagram showing in detail the arrangement of the control system of a camera according to the first embodiment.

FIG. 7 is a diagram showing in detail the arrangement of the control system of the camera according to the first embodiment.

As shown in FIG. 7, a CPU 71 for controlling the entire camera is connected to a photometric circuit 72, a distance measuring circuit 73, a shutter control mechanism 74, a focus control mechanism 75, a display circuit 76, a timer circuit 77, a storage circuit (EEPROM) 78, a photometric/distance measuring start switch 88, an exposure start switch 89, a rewind start switch 90, a magnetic information recording/reproducing circuit 82, a magnetic head 85, a film feed drive circuit 83, a feed mechanism 86, a film feed amount detection circuit 84, an input switch 79, a zoom state detection unit 80, and a view finder display 81. The display circuit 76 displays various types of information, e.g., photographing information and date. The timer circuit 77 creates date data. The storage circuit 78 temporarily stores information to be magnetically recorded. The magnetic head 85 records data from the magnetic information recording/reproducing circuit 82 on a film 87 having a magnetic recording section, or reads a signal recorded on the magnetic recording section of the film 87 having the magnetic recording section and supplies it to the magnetic information recording/reproducing circuit 82. The film feed drive circuit 83 controls the film feed amount. The feed mechanism 86 feeds the film having the magnetic recording section based on a control signal from the film feed drive circuit 83. The film feed amount detection circuit 84 detects the advance amount of the film. The input switch 79 is used for selecting the panorama mode. The zoom state detection unit 80 detects the zoom state in the optical zoom mode or in the pseudo zoom mode. The view finder display 81 displays a view finder field frame.

The control sequence of the first embodiment will be described with reference to the flow chart of FIG. 8. Referring to FIG. 8, only portions particularly concerning the present invention will be described in detail, and other portions will be described only briefly.

While the power is ON, if a zoom operation or an operation of the switch 88 (half depression (first stage) of the release button) is performed (steps S101 and S102), the CPU 71 discriminates whether or not the panorama mode is selected (step S103). If YES, the CPU 71 subsequently discriminates whether or not the camera is set in the optical zoom mode (step S106). If YES, the flow advances to the next step S107. If NO (the camera is set in the pseudo telephoto mode), the field frame is displayed in the view finder in accordance with the pseudo telephoto state (step S108). At this time, an informing mark of the pseudo telephoto mode can also be displayed. In order to clearly indicate that the panorama mode is not permitted for the purpose of setting the pseudo telephoto mode, for example, a pseudo telephoto mode informing mark is flickered (step S109).

In step S103, if the panorama mode is selected, the CPU 71 discriminates whether or not the camera is set in the optical zoom mode (step S106). If YES, a field frame for the panorama imaging field is displayed in the view finder field (step S107). At this time, a panorama mode mark can also be displayed. If the panorama mode is not selected and the optical zoom mode is not set, that is, when the pseudo telephoto mode is selected, the enlarging ratio of printing is extremely increased and the image quality expected by the photographer cannot be guaranteed. Hence, a field frame according to the pseudo telephoto mode is displayed in the view finder (step 105).

After these steps, the CPU 71 executes the sequence from step S110. More specifically, photometry and distance measuring are performed by the distance measuring circuit 73 (step S110), and turn-on of the switch 89 (exposure start switch) is waited (step S111). When the switch 89 is turned on, a focus control operation is performed by the focus control mechanism 75 (step S112), and an exposure operation is performed (step S113). When the exposure operation is completed in this manner, the film feed mechanism 86 is operated to start film winding (step S114). While the film is being wound, data to be recorded is transferred to the magnetic information recording/reproducing circuit 82 (details thereof will be described), and a magnetic recording operation is performed (step S115). When film winding is completed, the CPU 71 stops operation of the film feed mechanism 86 (steps S116 and S117), and information which is the same as the magnetically recorded information is recorded in the storage circuit 78, thereby ending all the operations (step S118).

A control sequence of a case wherein both the panorama mode and the pseudo telephoto mode are selected in the first embodiment will be described with reference to the flow chart of FIG. 9. In this routine, when both the panorama mode and the pseudo telephoto mode are selected, the panorama mode is given the higher priority and the pseudo telephoto mode is not permitted, and the enlarging ratio during printing is limited, thereby guaranteeing image quality (steps S208 and S209).

Accordingly, if the camera is set in the panorama mode (YES) and in the optical zoom mode (NO), a field frame for the panorama is displayed in the view finder, and a display is performed by means of, e.g., flickering a panorama mode informing mark to indicate that the pseudo telephoto mode is not permitted (steps S203, S206, S208, and S209). At this time, since the photographing optical system is at the farthest telephoto side, panorama photographing at the telephoto end of the optical zoom is possible. Any other sequence is the same as that of FIG. 8 described above and a detailed description thereof will be omitted.

As has been described above, in the pseudo telephoto mode, a limitation is imposed on the camera operation. A technique with which the photographer can easily sense that the camera has been set in the pseudo telephoto mode will be described with reference to FIGS. 10 and 11.

Referring to FIGS. 10 and 11, reference numerals 27 and 28 denote cam grooves for zooming; and 20 and 21, projections formed on frames supporting lens groups. These components are the same as those described with reference to FIG. 1.

Referring to FIG. 10, when the projections 20 and 21 are in the pseudo telephoto mode area, they are pushed by press members 61 pushed by springs 60. It is sufficiently possible to set the spring power amount such that a zoom frame 11 itself will stand against the springs 60 by friction or the like and not rotate.

In contrast to this, FIG. 11 shows clicks 62 and an elastic mechanism for pushing projections 20 and 21 sideways from the cam grooves. When this mechanism is employed and simultaneously the pattern of the zoom encoder 25 is set to match the clicks, discontinuous numerical points, e.g., x1.2, x1.4, x1.7, and x2 can be selected as the pseudo telephoto magnifications.

Then, the view finder display need not be continuously changed in accordance with the pseudo telephoto magnifications but can be selected among several display types, leading to simplification, thus contributing to simplification of the printer mechanism used for printing.

In these embodiments, in the pseudo telephoto mode, the operation touch is changed from that of the optical zoom mode by using the springs, thereby informing the photographer that the camera is set in the pseudo telephoto mode. The informing means is not limited to the springs, but may be a change in frictional force, sound, or power achieved by other means, e.g., grease, a change in surface roughness of surface finishing, or an electrical means.

A camera according to the second embodiment of the present invention will be described.

Figure 12:
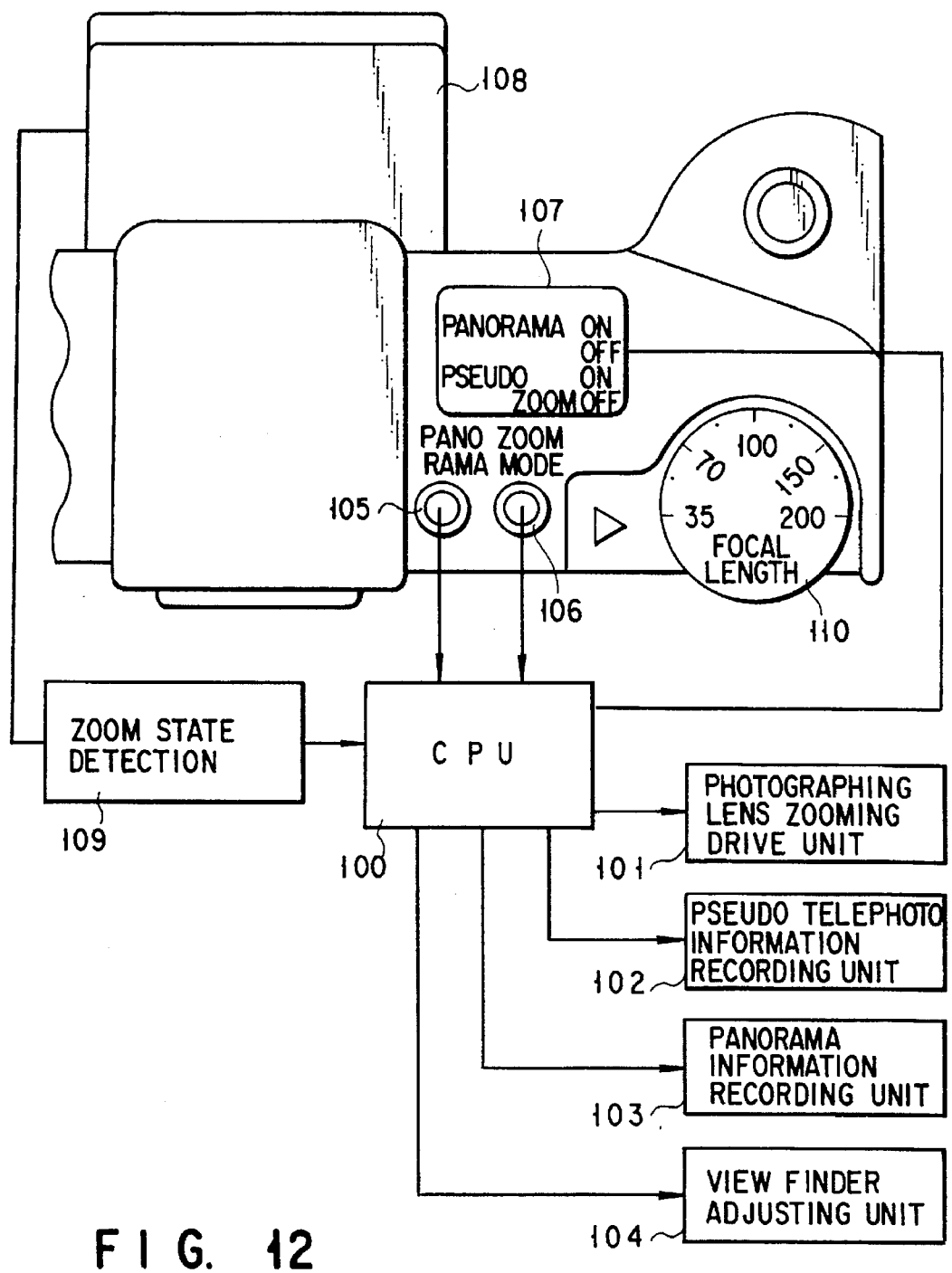
FIG. 12 is a block diagram showing the arrangement of a camera according to the second embodiment of the present invention.

FIG. 12 shows the arrangement of the second embodiment concerning switching between the optical zoom mode and the pseudo telephoto mode. Referring to FIG. 12, a lens barrel frame unit 108 capable of optical zooming is provided with a zoom state detection unit 109, e.g., a zoom encoder, for detecting optical zoom focal length information. A focal length input member 110, an optical zoom mode/pseudo telephoto mode selection switch 106, and a panorama mode selection switch 105 are provided on the camera body. The focal length input member 110 is used for inputting a focal length intended by the photographer. Information generated by the panorama mode selection switch 105, the selection switch 106, and the zoom state detection unit 109 and concerning the state of the camera are input to a CPU 100.

In accordance with logical determination to be described later, the CPU 100 transmits a view finder field display instruction signal to a view finder adjusting unit 104 comprising, e.g., an LCD and a drive circuit, and a display instruction signal to a display 107 on the camera housing.

Furthermore, the CPU 100 transmits an instruction signal concerning a drive amount to a photographing lens zooming drive unit 101 to perform zooming by driving the optical lens, transmits information concerning a trimming amount for obtaining the pseudo zoom effect to a pseudo telephoto information recording unit 102, and transmits information concerning selection of the panorama mode to a panorama information recording unit 103. The pseudo telephoto information recording unit 102 and the panorama information recording unit 103 are members for optically or magnetically recording various information on the film and include control and arrangement as described before with reference to FIGS. 5 and 6.

An operation corresponding to mode selection of the camera according to the second embodiment will be described in detail with reference to FIG. 13. When the optical zoom mode is selected by the zoom mode selection switch 106, the photographer selects, with a higher priority, zooming by means of actual moving of the optical lens rather than the pseudo telephoto mode using trimming. Therefore, trimming is not performed within a range that can be covered by optical zooming. The photographing lens zooming drive unit 101, e.g., a lens zooming motor is operated by the instruction from the CPU 100, thereby performing focus control.

When a focal length exceeding a range that can be covered by the optical zooming is selected, the photographing lens is driven up to the telephoto limit by optical zooming. Thereafter, trimming is performed for a portion exceeding the telephoto limit. Then, synthesis is performed to satisfy the intended focal length. The trimming amount obtained at this time is calculated by the CPU 100 and recorded on the film optically or magnetically.

When the pseudo telephoto mode is selected by the selection switch 106, the following operation is performed. Namely, if it is detected from an output from the zoom state detection unit 109 that an actual focal length f0 of the lens barrel frame unit 108 of the camera at this time point is equal to or larger than a focal length f specified by the focal length input member 110 and intended by the photographer, since the intended imaging field range is larger than the photographing imaging field range which is optically obtained, the focal length f cannot be realized by trimming. Accordingly, optical zooming is performed not by trimming but by moving the photographing lens with the zooming drive unit 101.

Inversely, when the focal length f0 is smaller than the focal length f, a portion of the range of the optically obtained imaging field is trimmed and the remaining portion is enlarged and printed. Then, a picture having an apparent telephoto enlarging effect which is the same as that of a picture photographed with the focal length f can be obtained. Then, information concerning trimming and calculated by the CPU 100 is recorded on the film by using the pseudo telephoto information recording unit 102 without moving the optical system, thereby realizing the intention of the photographer.

Control of the camera shown in FIG. 13 will be described with reference to FIG. 14. Note that a description of portions common to the sequences shown in FIGS. 8 and 9 will be omitted.

When it is determined in step S303 that the camera is set in the pseudo telephoto mode, the current optical zoom focal length f0 and an intended input focal length f are compared in step S307. If f≧f0, a corresponding field frame for pseudo telephoto is displayed in the view finder (step S308). If f<f0, the intended focal length f is shorter than the current optical focal length f0, i.e., zooming at the wide-angle side is needed. Therefore, zooming is performed by optical zooming to reach the focal length f (step S305).

If it is determined in step S303 that the pseudo telephoto mode is not set, f is compared with the telephoto limit focal length fT of optical zooming. If NO in step S304, the focal length is adjusted by optical zooming up to fT. Then, after a pseudo telephoto magnification corresponding to f is calculated from fT, a corresponding pseudo telephoto field frame is displayed in the view finder (step S308). If fT≧f, zooming is performed by optical zooming up to the focal length f (step S305). The subsequent sequence (steps S309 to S317) is the same as that in the flow chart of FIG. 8.

According to this operation, when the optical zoom mode is selected, the optical system is driven in the optical zoom operation range, and the object is actually enlarged and recorded on the film, so that a picture having a higher quality than that of a picture obtained by trimming can be obtained. At the same time, when the pseudo telephoto mode is selected, the optical system is not usually driven but an enlarged printed picture can be obtained by trimming, so that photographing free from wasteful power consumption caused by zooming the optical system and a time lag is enabled. As a result, photographing according to the expectation of the photographer can be performed.

Embodiments concerning switching between the optical zoom mode and the pseudo telephoto mode have been described. In each of the optical zoom mode and the pseudo telephoto mode, selection/non-selection of the panorama mode can be made. As described above, when the pseudo telephoto mode and the panorama mode are simultaneously executed, the enlarging ratio during picture printing is greatly increased, and a picture having roughness is obtained, leading to an unexpected failure. This can be coped with in accordance with the same manner as that described in the second embodiment. For example, the technique that places a higher priority to the pseudo telephoto mode or a technique that places a higher priority to the panorama mode may be employed to cope with this state.

As has been described above in detail, according to the present invention, a control scheme can be realized in a simple manner, in which photographing in the panorama mode in the entire range of optical zooming is enabled, and when both the panorama mode and the pseudo telephoto mode are selected at once, a degradation in printing image quality is prevented without any unexpected failure against the will of the photographer.

When the pseudo telephoto mode has been selected, it can be easily recognized from a difference in operation touch. Then, misunderstanding concerning the limitation on the panorama mode and the pseudo telephoto mode can be decreased. Furthermore, the fact that the image quality is slightly degraded when the image is enlarged and printed in the pseudo telephoto mode can be informed to the photographer in advance.

Also, a camera having the following advantages can be obtained. Namely, in the optical zoom mode, the panorama mode can always be selected. In the pseudo telephoto mode, although printing having a pseudo telephoto effect can be performed, the panorama mode will not be set, thereby obtaining a high-quality image. Simultaneously, which one of the plurality of modes is selected can be easily discriminated.

Additional advantages and modifications will readily occur to those skilled in the art. Therefore, the invention in its broader aspects is not limited to the specific details, and representative devices shown and described herein.

Accordingly, various modifications may be made without departing from the spirit or scope of the general inventive concept as defined by the appended claims and their equivalents.

What is claimed is:

1. A camera capable of zooming, having an optical zoom mode for changing a magnification of an object by optically shifting a photographing lens when an ordinary photographing imaging field range is specified as a printing range, comprising:

panorama mode specifying means for designating a horizontally long area as a printing range by shielding photographing light beams at upper and lower portions of the ordinary photographing imaging field range when the optical zoom mode is specified;

pseudo telephoto mode specifying means for designating a range narrower than the ordinary photographing imaging field range as a printing range;

mode state discriminating means for discriminating which of the optical zoom mode, panorama mode, or pseudo telephoto mode is specified, the panorama mode and the pseudo telephoto mode being capable of being specified as concurrent photographing settings; and canceling means for preferentially setting said camera for photographing in the pseudo telephoto mode, said canceling means canceling the panorama mode, which has been previously specified, when the pseudo telephoto mode is specified by said pseudo telephoto mode specifying means.

2. A camera capable of zooming, having an optical zoom mode for changing a magnification of an object by optically shifting a photographing lens when an ordinary photographing imaging field range is specified as a printing range, comprising:

panorama mode specifying means for designating a horizontally long area as a printing range by shielding photographing light beams at upper and lower portions of the ordinary photographing imaging field range when the optical zoom mode is specified;

pseudo telephoto mode specifying means for designating a range narrower than the ordinary photographing imaging field range as a printing range;

mode state discriminating means for discriminating which of the optical zoom mode, panorama mode, or pseudo telephoto mode is specified, the panorama mode and pseudo telephoto mode being capable of being manually designated one after the other by a user as concurrent photographing settings; and prohibiting means for prohibiting the pseudo telephoto mode from being performed in a photographing operation when said mode state discriminating means discriminates that said camera is already set in the panorama mode.

3. A camera capable of zooming, having an optical zoom mode for changing a magnification of an object by optically shifting a photographing lens when an ordinary photographing imaging field range is specified as a printing range, comprising;

panorama mode specifying means for designating a horizontally long area as a printing range by shielding photographing light beams at upper and lower portions of the ordinary photographing imaging field range while the optical zoom mode is already specified;

pseudo telephoto mode specifying means for designating a range narrower than the ordinary photographing imaging field range as a printing range;

mode state discriminating means for discriminating which of the optical zoom mode, panorama mode, or pseudo telephoto mode is specified, the panorama mode and pseudo telephoto mode being capable of being manually designated one after the other by a user as concurrent photographing settings; and mode control means for, when said pseudo telephoto mode specifying means is actuated to specify the pseudo telephoto mode while a latest mode discriminated by said mode state discriminating means is a panorama mode, performing one of the following functions:

prohibiting the pseudo telephoto mode from being performed in a photographing operation; and canceling the panorama mode, in order to preferentially set said camera for photographing in the pseudo telephoto mode.

4. A camera having an optical zoom mode for changing a magnification of an object by optically shifting a photographing lens within an ordinary photographing imaging field range, comprising:

pseudo telephoto mode specifying means for designating, when set in a pseudo telephoto mode, a photographing imaging field range narrower than an ordinary photographing imaging field range as a printing range;

panorama mode specifying means for designating, when set in a panorama mode, a horizontally long area as a printing range by shielding photographing light beams at upper and lower portions of the ordinary photographing imaging field range;

mode state discriminating means for discriminating whether or not a current mode to which the camera is set is the panorama mode, the panorama mode and pseudo telephoto mode being capable of being manually designated one after the other by a user as concurrent photographing settings; and non-permitting means for not permitting performance in a photographing operation of the pseudo telephoto mode when a discrimination output from said mode state discriminating means indicates that the current mode is the panorama mode.

5. A camera according to one claim 4, further comprising photographing lens barrel means having a first cam area where said photographing lens is moved between a telephoto end and a wide-angle end in a direction of an optical axis and a second cam area where said photographing lens is rotated in a direction perpendicular to the optical axis while said photographing lens is located at the telephoto end, and said photographing lens located in the first area when said camera is set in the optical zoom mode and panorama mode, and is located in the second area when said camera is set in the pseudo telephoto mode.

6. A camera according to claim 5, further comprising rotating amount detection means for detecting a rotation amount of said photographing lens located in the second area, so that a non-optical pseudo magnification change amount is determined by the rotating amount.

7. A camera according to claim 6, further comprising field frame display means for displaying a field frame narrower than an ordinary photographing imaging field range and indicating an area to be utilized for printing in a view finder based on the non-optical pseudo magnification change amount.

8. A camera according to claim 6, further comprising printing information display means for displaying information indicating an area utilized for printing in said view finder based on the non-optical pseudo magnification change amount.

9. A camera having an optical zoom mode and a pseudo telephoto mode and capable of performing panorama photographing in a panorama photographing mode, comprising:
  a zoom operating member for selectively setting one of a focal length in an optical zoom area and an enlarging magnification in the pseudo telephoto area;
  detection means, disposed on a photographing lens barrel and capable of performing discrimination between the optical zoom area and the pseudo telephoto area, for detecting one of a focal length in the optical zoom area and an enlarging magnification in the pseudo telephoto area;
  panorama photographing mode setting means capable of detecting that the panorama photographing mode is selected;
  recording means for recording mode information on a photographing film while said camera is in one of the pseudo telephoto mode and the panorama photographing mode; and
  control means for detecting states of at least the pseudo telephoto mode and the panorama photographing mode and, when the panorama photographing mode and the pseudo telephoto mode are manually designated one after the other by a user as concurrent photographing settings, prohibiting the camera from simultaneously photographing in both the pseudo telephoto and panorama photographing modes.

10. A camera according to claim 9, wherein said detection means is an encoder.

11. A camera according to claim 9, wherein said recording means is magnetic recording means for performing magnetic recording on a magnetic track on a photographing lens having a magnetic recording section.

12. A camera according to claim 9, further comprising predetermined informing means for, when said camera is in the pseudo telephoto mode or the panorama photographing mode, informing a photographer of said camera set in the pseudo telephoto mode or the panorama photographing mode.

13. A camera according to claim 12, wherein when said zoom operating member is in the pseudo telephoto area, said predetermined informing means informs that said zoom operating member is in the pseudo telephoto area, by imparting a characteristic operating touch to said zoom operating member.

14. A camera according to claim 13, wherein an enlarging magnification of the pseudo telephoto area changes discontinuously.

15. A camera according to claim 13, wherein a discontinuous change in power occurs in said zoom operating member to correspond to the enlarging magnification of the pseudo telephoto area.

16. A camera having an optical zoom mode and a pseudo telephoto mode and capable of panorama photographing in a panorama photographing mode, comprising:
  an operating means for selectively setting one of the optical zoom mode and the pseudo telephoto mode;
  a focal length setting member for setting a substantial focal length of a photographing lens;
  detection means, disposed on a photographing lens barrel and capable of performing discrimination between an optical zoom area and a pseudo telephoto area, for detecting one of a focal length in the optical zoom area and an enlarging magnification in the pseudo telephoto area;
  panorama photographing mode setting means capable of detecting that the panorama photographing mode is selected;
  recording means for recording mode information on a photographing film while said camera is in one of the pseudo telephoto mode and the panorama photographing mode; and
  control means for detecting states of at least the pseudo telephoto mode and the panorama photographing mode and, when the pseudo telephoto mode and the panorama photography mode are manually designated one after the other by a user as concurrent photographing settings, prohibiting a concurrent performance of both the pseudo telephoto and panorama photographing modes for photographing.

17. A camera according to claim 16, wherein when the pseudo telephoto mode is selected and a focal length of said photographing lens is shifted from a current position to a telephoto side, the pseudo telephoto mode is given a higher priority without performing optical zooming.

18. A camera according to claim 16, wherein said detection means is an encoder.

19. A camera according to claim 16, wherein said recording means is magnetic recording means for performing magnetic recording on a magnetic track on a photographing track having a magnetic recording section.

20. A trimming camera capable of optical zooming comprising:
  optical zoom means for setting a photographing field angle;
  first trimming mode specifying means for printing only a predetermined first area of an exposure area of a photographing film;
  second trimming mode specifying means for printing, of the exposure area of the photographing film, only a second area of the exposure area of the photographing film;
  recording means for recording on the film information representing that a photographing was based on one of the first and second trimming modes; and
  control means for detecting at least whether said camera is in one of the first and second trimming mode states, the first and second trimming modes being capable of being manually designated one after the other by a user as concurrent photographing settings, the control means prohibiting a concurrent performance of both the first and second trimming modes for photographing.

21. A camera according to claim 20, wherein the first trimming mode is a panorama mode with which printing is performed by omitting a predetermined amount of an upper limit and a lower limit of the exposure area of the photographing film.

22. A camera according to claim 20, wherein said recording means is magnetic recording means for performing magnetic recording on a magnetic track on the photographing film.

23. A camera capable of optical zoom photographing, pseudo telephoto photographing in which a photographing image field range narrower than a photographing image field range of the optical zoom photographing is set as a printing field, and panorama photographing in which a photographing image field range other than a part of upper and lower portions of the optical zoom photographing image field is set as a printing field, the pseudo telephoto photographing and the panorama photographing being capable of being specified as concurrent photographing settings, comprising:
  an optical system capable of changing a focal length and of the optical zoom photographing;
  pseudo telephoto photographing means for, when set in pseudo telephoto photographing, magnifying a part of an image formed by the optical system at a predetermined focal length of the optical system and for printing the image;

panorama photographing means for, when set in panorama photographing, magnifying the image portion other than a part of upper and lower portions formed by the optical system at an arbitrary focal length in a focal length region of the optical system, in which the predetermined focal length is included, and for printing the image;

pseudo telephoto photographing setting means for setting a photographing by said pseudo telephoto photographing means;

panorama photographing setting means for setting a photographing by said panorama photographing means; and control means for inhibiting panorama photographing from occurring when the pseudo telephoto photographing is set by said pseudo telephoto photographing setting means even if panorama photographing was previously set by said panorama photographing setting means.

24. A camera capable of optical zoom photographing, pseudo telephoto photographing in which a photographing image field range narrower than a photographing image field range of the optical zoom photographing is set as a printing field, and panorama photographing in which a photographing image field range other than a part of upper and lower portions of the optical zoom photographing image field is set as a printing field, the pseudo telephoto photographing and the panorama photographing being capable of being specified as concurrent photographing settings, comprising:

an optical system capable of changing a focal length and of the optical zoom photographing;

pseudo telephoto photographing means for, when set in a pseudo telephoto mode, magnifying a part of an image formed by the optical system at a predetermined focal length of the optical system and for printing the image;

panorama photographing means for, when set in a pseudo panorama mode, magnifying the image portion other than a part of upper and lower portions formed by the optical system at an arbitrary focal length in a focal length region of the optical system, in which the predetermined focal length is included, and for printing the image;

pseudo telephoto photographing setting means for setting a photographing by said pseudo telephoto photographing means;

panorama photographing setting means for setting a photographing by said panorama photographing means; and control means for inhibiting pseudo telephoto photographing from occurring when the panorama photographing is set by said panorama photographing setting means even if the pseudo telephoto photographing was previously set by said pseudo telephoto photographic setting means.

25. A camera capable of optical zoom photographing, pseudo telephoto photographing in which a photographing image field range narrower than a photographing image field range of the optical zoom photographing is set as a printing field, and panorama photographing in which a photographing image field range other than a part of upper and lower portions of the optical zoom photographing image field is set as a printing field, the pseudo telephoto photographing and the panorama photographing being capable of being manually designated one after the other by a user as concurrent photographing settings, comprising:

an optical system capable of changing a focal length and of the optical zoom photographing;

pseudo telephoto photographing means for, when set in a pseudo telephoto mode, magnifying a part of an image formed by the optical system at a predetermined focal length of the optical system and for printing the image;

panorama photographing means for, when set in a panorama mode, magnifying the image portion other than a part of upper and lower portions formed by the optical system at an arbitrary focal length in a focal length region of the optical system, in which the predetermined focal length is included, and for printing the image;

pseudo telephoto photographing setting means for setting a photographing by said pseudo telephoto photographing means;

panorama photographing setting means for setting a photographing by said panorama photographing means; and control means for inhibiting the panorama photographing and the pseudo telephoto photographing from being performed concurrently in a photographing operation.

26. A camera capable of optical zoom photographing, pseudo telephoto photographing in which a photographing image field range narrower than a photographing image field range of the optical zoom photographing is set as a printing field, and panorama photographing in which the photographing image field range other than a part of upper and lower portions of the optical zoom photographing image field range is set as a printing field, the pseudo telephoto photographing and the panorama photographing being capable of being manually designated one after the other by a user as concurrent photographing settings, comprising:

finder indicating means including means for indicating a panorama field range in upper and lower portions of a field of view of a finder in order to represent a panorama photographing state, thereby specifying a panorama field, and for indicating a plurality of pseudo telephoto photographing field ranges in upper, lower, left and right portions of the field of view of the finder in order to represent a pseudo telephoto photographing state, thereby specifying a pseudo telephoto field;

pseudo telephoto data recording means for, when set to pseudo telephoto photographing, recording pseudo telephoto data on a film;

panorama data recording means for, when set to panorama photographing, recording panorama data on a film;

pseudo telephoto photographic setting means for setting said pseudo telephoto data recording means in the pseudo telephoto photographing in order to magnify and print only a part of an image which is formed by the optical system at a predetermined focal length of the optical system and is indicated by said finder indicating means as an image corresponding to the pseudo telephoto photographing field;

panorama photographing setting means for setting said panorama data recording means in the panorama photographing in order to magnify and print an image portion other than a part of upper and lower portions of a part of an image that is formed by the optical system at an arbitrary focal length in a focal length region of the optical system, in which the predetermined focal length is included, and that is indicated by said finder indicating means as an image corresponding to the panorama photographing field; and control means for inhibiting the pseudo telephoto photographing from being performed in a photographing operation when the panorama photographing setting means has set the panorama photographing, by inhibiting the pseudo telephoto field from being designated, and said control means inhibiting the pseudo telephoto data from being recorded on a film when the panorama photographing setting means has set the panorama photographing.

27. A camera capable of optical zoom photographing, pseudo telephoto photographing in which a photographing image field range narrower than a photographing image field range of the optical zoom photographing is set as a printing field, and panorama photographing in which the photographing image field range other than a part of upper and lower portions of the optical zoom photographing image field range is set as a printing field, the pseudo telephoto photographing and the panorama photographing being capable of being manually designated one after the other by a user as concurrent photographing settings, comprising:

finder indicating means including means for indicating a panorama field range in upper and lower portions of a field of view of a finder in order to represent a panorama photographing state, thereby specifying a panorama field, and for indicating a plurality of pseudo telephoto photographing field ranges in upper, lower, left and right portions of the field of view of the finder in order Go represent a pseudo telephoto photographing state, thereby specifying a pseudo telephoto field;

pseudo telephoto data recording means for, when set to pseudo telephoto photography, recording pseudo telephoto data on a film;

panorama data recording means for, when set to panorama photography, recording panorama data on a film;

pseudo telephoto photographic setting means for setting said pseudo telephoto data recording means in the pseudo telephoto photographing in order to magnify and print only a part of an image which is formed by the optical system at a predetermined focal length of the optical system and is indicated by said finder indicating means as an image corresponding to the pseudo telephoto photographing field;

panorama photographing setting means for setting said panorama data recording means in the panorama photographing in order to magnify and print an image portion other than a part of upper and lower portions of a part of an image that is formed by the optical system at an arbitrary focal length in a focal length region of the optical system, in which the predetermined focal length is included, and that is indicated by said finder indicating means as an image corresponding to the panorama photographing field; and control means for inhibiting the panorama photographing from being performed in a photographing operation when the pseudo telephoto photographing setting means has set the pseudo telephoto photographing, by inhibiting the panorama photographing field from being designated, and said control means inhibiting the panorama data from being recorded on a film when the panorama photographing setting means has set the panorama photographing.

28. A camera capable of optical zoom photographing, pseudo telephoto photographing in which a photographing image field range narrower than a photographing image field range of the optical zoom photographing is set as a printing field, and panorama photographing in which the photographing image field range other than a part of upper and lower portions of the optical zoom photographing is set as a printing field, the pseudo telephoto photographing and the panorama photographing being capable of being manually designated one after the other by a user as concurrent photographing settings, comprising:

finder indicating means including means for indicating a panorama field range in upper and lower portions of a field of view of a finder in order to represent a panorama photographing state, thereby specifying a panorama field, and for indicating a plurality of pseudo telephoto photographing field ranges in upper, lower, left and right portions of the field of view of the finder in order to represent a pseudo telephoto photographing state, thereby specifying a pseudo telephoto field;

pseudo telephoto data recording means for, when set to pseudo telephoto photography, recording pseudo telephoto data on a film;

panorama data recording means for, when set to panorama photography, recording panorama data on a film;

pseudo telephoto photographic setting means for setting said pseudo telephoto data recording means in the pseudo telephoto photographing in order to magnify and print only a part of an image which is formed by the optical system at a predetermined focal length of the optical system and is indicated by said finder indicating means as an image corresponding to the pseudo telephoto photographing field;

panorama photographing setting means for setting said panorama data recording means in the panorama photographing in order to magnify and print an image portion other than a part of upper and lower portions of a part of an image that is formed by the optical system at an arbitrary focal length in a focal length region of the optical system, in which the predetermined focal length is included, and that is indicated by said finder indicating means as an image corresponding to the panorama photographing field; and control means for inhibiting the panorama photographing and the pseudo telephoto photographing from being performed concurrently in a photographing operation.

* * * * *

UNITED STATES PATENT AND TRADEMARK OFFICE
CERTIFICATE OF CORRECTION

PATENT NO.     : 5,659,809              Page 1 of 1
DATED          : August 19, 1997
INVENTOR(S)    : Nagao, Masaki It is certified that error appears in the above-identified patent and that said Letters Patent is hereby corrected as shown below:

<u>Drawings,</u>
Fig. 7,   "11" should be -- 71 --.

Figure 8:
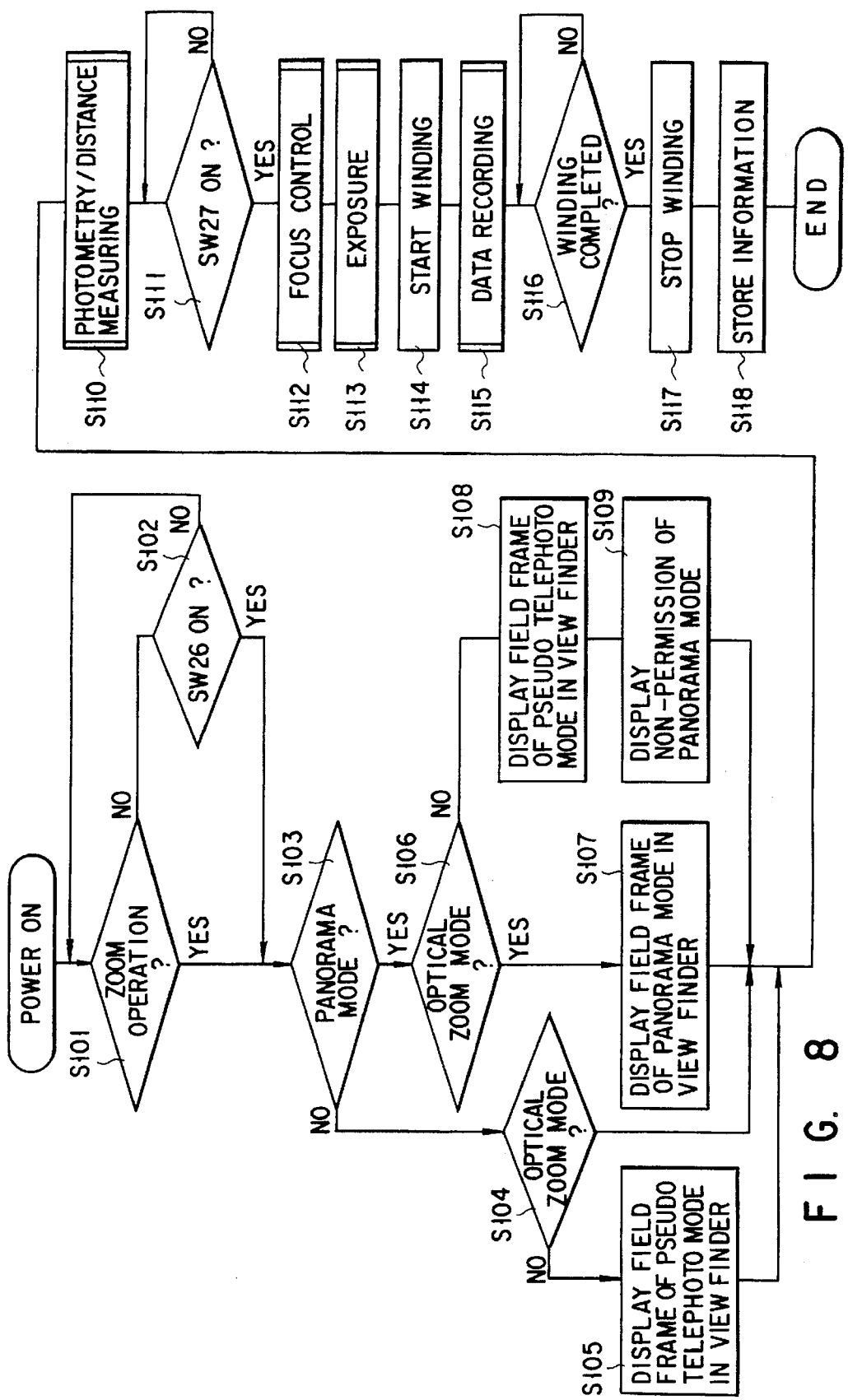
FIG. 8 is a flow chart showing the control sequence of the first embodiment.

Fig. 8,   "SW26" in Step S102 should be -- SW88 --;
          "SW27" in Step S111 should be -- SW89 --.

Figure 9:
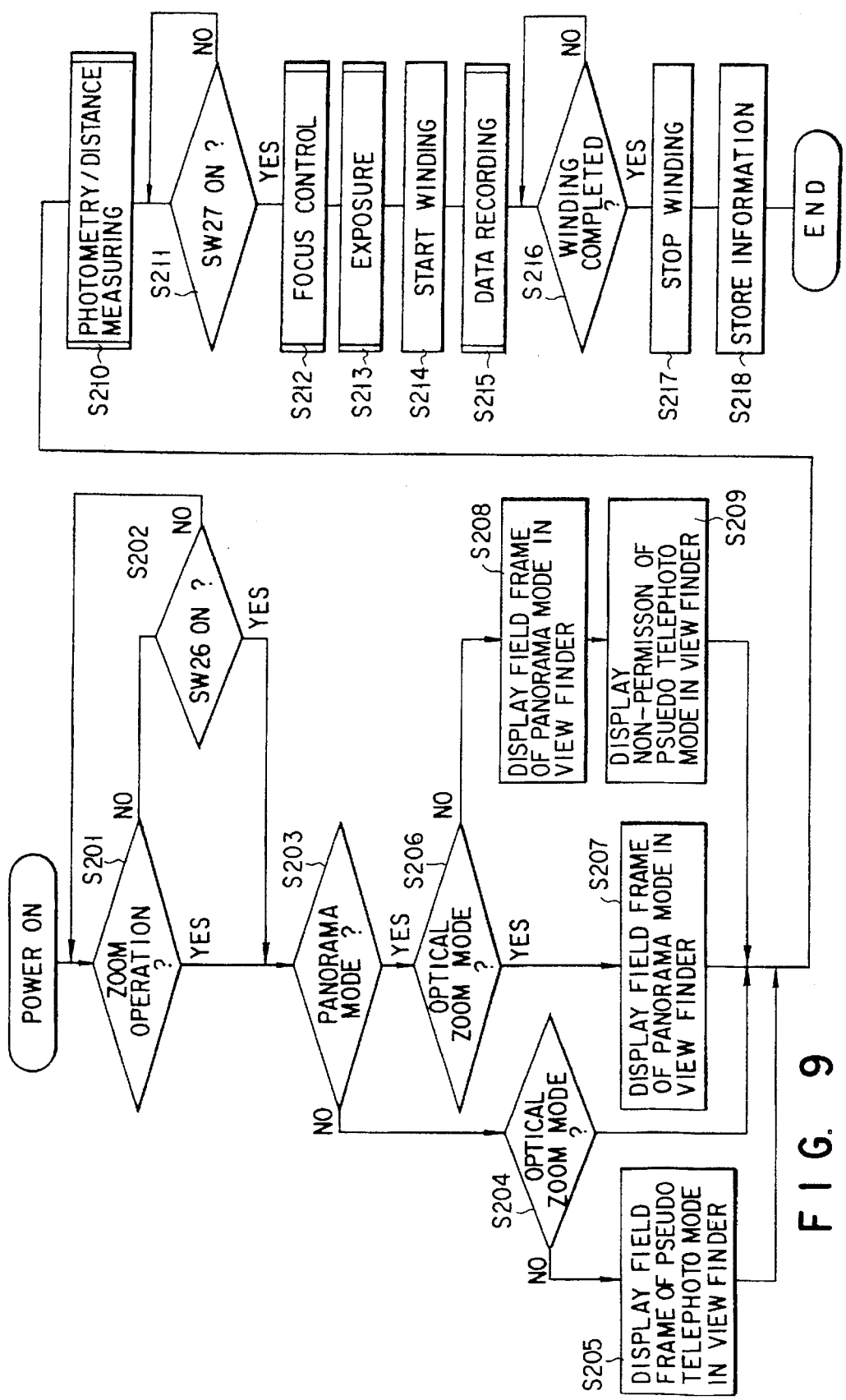
FIG. 9 is a flow chart showing the control sequence of a case wherein both the panorama mode and the pseudo telephoto mode are selected in the first embodiment.

Fig. 9,   "SW26" in Step S202 should be -- SW88 --;
          "SW27" in Step S211 should be -- SW89 --.

Fig. 14,  "SW26" in Step S302 should be -- SW88 --;
          "SW27" in Step S310 should be -- SW89 --.

Signed and Sealed this

Eleventh Day of February, 2003

JAMES E. ROGAN
*Director of the United States Patent and Trademark Office*